United States Patent [19]
Hirakata et al.

[11] Patent Number: 5,977,562
[45] Date of Patent: Nov. 2, 1999

[54] ELECTRO-OPTICAL DEVICE

[75] Inventors: Yoshiharu Hirakata, Kanagawa; Shunpei Yamazaki, Tokyo, both of Japan

[73] Assignee: Semiconductor Energy Laboratory Co., Ltd., Kanagawa-ken, Japan

[21] Appl. No.: 08/748,887

[22] Filed: Nov. 14, 1996

[30] Foreign Application Priority Data

Nov. 14, 1995 [JP] Japan ..................... 7-321075
Dec. 23, 1995 [JP] Japan ..................... 7-350169

[51] Int. Cl.$^6$ .......... H01L 29/04; H01L 31/036; G02F 1/136; G02F 1/1343
[52] U.S. Cl. ............... 257/72; 257/59; 349/42; 349/141
[58] Field of Search ................. 438/30; 257/59, 257/72, 443, 448; 349/42, 43, 54, 59, 141

[56] References Cited

FOREIGN PATENT DOCUMENTS

| | | |
|---|---|---|
| 63-21907 | 12/1979 | Japan . |
| 6-202073 | 12/1992 | Japan . |
| 6-214244 | 1/1993 | Japan . |
| 7-36058 | 7/1993 | Japan . |
| 7-43716 | 7/1993 | Japan . |
| 7-43744 | 7/1993 | Japan . |
| 6-160878 | 9/1993 | Japan . |
| 7-120791 | 10/1993 | Japan . |
| 7-134301 | 11/1993 | Japan . |
| 7-72491 | 2/1994 | Japan . |

*Primary Examiner*—Brian Dutton
*Attorney, Agent, or Firm*—Fish & Richardson P.C.

[57] ABSTRACT

In a pixel structure of an active matrix liquid crystal display device, a common electrode branching out from a common line which is maintained at a specified voltage and a pixel electrode connected to a drain of a thin-film transistor arranged on a common plane are wound around each other in spiral form. Electric fields generally oriented parallel to a substrate are produced between the common electrode and pixel electrode arranged in each pixel on the substrate. These electric fields drive a liquid crystal material to provide a visual display. The pixel electrode is surrounded, or fenced off, by the common electrode in each pixel so that the former is kept unaffected from interference from a nearby gate line and/or source line.

12 Claims, 13 Drawing Sheets

ELECTRO-OPTICAL DEVICE

BACKGROUND OF THE INVENTION

1. Technical Field of the Invention

The present invention pertains generally to active matrix display devices and, more particularly, relates to wiring design and electrode structure on substrates of the active matrix display devices.

2. Description of the Related Art

The prior art to which the invention is directed includes a conventionally known display device structure, in which a liquid crystal is sandwiched between two substrates, and an electric field is applied to the liquid crystal through a pair of electrodes provided on the substrates to vary optical properties of the liquid crystal for providing a visual display of information.

Operation of a liquid crystal display (LCD) having this conventionally used structure is based on molecular behaviors of the liquid crystal observed when it is subjected to an electric field. When an electric field is applied between the two substrates, molecules of the liquid crystal align with a direction parallel to, or perpendicular to, the surfaces of the substrates, for instance. Such alignment of the molecules in a specific direction causes a change in the optical properties of the liquid crystal, whereby a visual display corresponding to the applied field is obtained.

In a case where the molecules of the liquid crystal align with the field direction, or become perpendicular to the surfaces of the two substrates, the liquid crystal exhibits significant anisotropic properties with respect to the transmission of light. Optical anisotropy of this type of liquid crystal can be recognized through a comparison of images seen on an LCD screen from two different viewing angles, that is, from a direction perpendicular to the screen surface and from a direction inclined at a slight angle relative to the perpendicular direction. This optical anisotropy occurs because the line of sight aligns with crystalline axes when the LCD display is seen from the perpendicular direction, and does not align when the screen is seen from an inclined viewing angle. The anisotropic properties can be easily recognized from the fact that an image displayed on a conventional LCD device becomes unclear or dim when viewed at an oblique angle, for instance.

It is commonly known that the above phenomenon places limitations in the viewing field of the LCD device so that its angle of view is smaller than that of a cathode ray tube (CRT) or an electroluminescent (EL) display device.

To overcome the aforementioned problem, Japanese Examined Patent Application Publication No. 63-21907 discloses a structure of an LCD device, in which long axes of molecules of a liquid crystal are rotated in a plane parallel to a pair of substrates to vary optical properties of the liquid crystal. This structure provides a solution to the problem related to the viewing field as the molecular axes do not become perpendicular to the substrates.

FIG. 21 shows a display element, or pixel, of an LCD device according to a conventional structure for rotating individual molecules of a liquid crystal in a plane parallel to substrates.

The LCD device comprises gate lines 11 and source lines 12 arranged to form a grid pattern as shown in FIG. 21. Each gate line 11 is a conductor line for transmitting a signal to a gate of a thin-film transistor 13 while each source line 12 is a conductor line for transmitting an image signal to a source of the thin-film transistor 13. A pixel electrode 14 connected to a drain of the thin-film transistor 13 forms a comb pattern as does another electrode 15. These electrodes 14 and 15 are arranged in such a way that individual teeth of the former lie in spaces between individual teeth of the latter. As can be seen from FIG 21, the electrode 15 branches out from a conductor line 16 which is maintained at a specified voltage.

The comblike electrodes 14 and 15 thus arranged create an electric field oriented parallel to the surfaces of the substrates, and this makes it possible to cause the individual molecules of the liquid crystal to rotate in the plane parallel to the substrates.

In the structure shown in FIG. 21, however, part of the pixel electrode 14 runs side by side with the source line 12 in an area designated by the numeral 17. Furthermore, part of the pixel electrode 14 runs side by side with the gate line 11 in an area designated by the numeral 18. This type of close parallel runs in a conductor pattern is apt to induce mutual interference due to coupling between them. More specifically, signals are disturbed between the pixel electrode 14 and source line 12, and between the pixel electrode 14 and gate line 11, resulting in degradation in image quality.

In the structure of FIG. 21, individual comblike electrodes 15 in each column of the LCD device are connected together by a conductor line 16. FIG. 22 shows an alternative conventional structure, in which a plurality of comblike electrodes 25 in each row of an LCD device are connected together by a conductor line 26 which is maintained at a specified voltage. Even when a conductor layout shown in FIG. 22 is employed, the problem of interference between electrodes remains unsolved though.

In the structure depicted in FIG. 22, gate lines 21 and source lines 22 are arranged to form a grid pattern. Each gate line 21 is a conductor line for transmitting a signal to a gate of a thin-film transistor 23 while each source line 22 is a conductor line for transmitting an image signal to a source of the thin-film transistor 23. A pixel electrode 24 is connected to a drain of the thin-film transistor 23. Each comblike electrode 25 branches out from the conductor line 26 which is held at the specified voltage. The electrodes 24 and 25 are arranged in such a way that individual teeth of the former lie in spaces between individual teeth of the latter. The comblike electrodes 24 and 25 thus arranged create an electric field oriented parallel to the surfaces of substrates of the LCD device.

The structure of FIG. 22 is still apt to cause mutual interference between the pixel electrode 24, which forms a pixel, and the source line 22 in an area designated by the numeral 27. An area designated by the numeral 28 where the pixel electrode 24 and gate line 21 run parallel to each other is also susceptible to mutual interference.

SUMMARY OF THE INVENTION

The present invention has been made in the light of the aforementioned problems of the prior art. Accordingly, it is an object of the invention to provide a structure which can solve the problem related to limitations in the viewing field of an LCD device. It is another object of the invention to provide a structure which can solve the problem occurring when applying an electric field in a direction parallel to substrates of the LCD device, and thereby present a clear image.

To solve the aforementioned problems, an active matrix display device of the invention comprises gate lines and source lines arranged on a substrate to form together a grid pattern, thin-film transistors located in individual pixels, each of the thin-film transistors having a gate connected to one of the gate lines and a source connected to one of the source lines, first electrodes individually connected to drains of the thin-film transistors, common lines maintained at a specified voltage, and second electrodes branching out from the common lines, wherein the first and second electrodes are arranged into spiral (swirl) form with their arms wound around each other in each pixel.

In another form of the invention, an active matrix display device comprises gate lines and source lines arranged on a substrate to form together a grid pattern, thin-film transistors located in individual pixels, each of the thin-film transistors having a gate connected to one of the gate lines and a source connected to one of the source lines, first electrodes individually connected to drains of the thin-film transistors, common lines maintained at a specified voltage, and second electrodes individually connected to the common lines, wherein the first and second electrodes are so arranged that their arms lie in spaces between each other's arms in each pixel.

In still another form of the invention, an active matrix display device comprises first electrodes individually connected to drains of thin-film transistors formed in respective pixels on a substrate, second electrodes for producing electric fields between the first and second electrodes, the electric fields containing components parallel to the substrate, wherein the first and second electrodes are individually shaped into spiral (swirl) form with their arms wound around each other in each pixel on the substrate.

In yet another form of the invention, an active matrix liquid crystal display device comprises a plurality of pixels, each pixel including a pair of electrodes which are wound around each other in spiral (swirl) form on a substrate, wherein the pair of electrodes are so arranged that electric fields containing components parallel to the substrate are produced between the electrodes.

In a basic structure of the display devices of this invention, individual pixel electrodes are arranged on a single device-stacking substrate which is placed parallel to a facing substrate. This structure offers the following advantages over prior art technologies.

According to the invention, it is not necessary to form a conductor pattern on the facing substrate. This structure facilitates manufacturing processes of display panels. In addition, it becomes easier to align the facing substrate and the device-stacking substrate with each other because the structure of the invention provides an increased level of tolerance for spacing between the substrates applied when they are bonded to each other.

Furthermore, it becomes possible to form electrodes and conductor lines with greater accuracy so that distances between individual electrodes can be set precisely and the individual pixels can be created at a high density.

Although a capacitive load is produced by a pair of substrates with a liquid crystal material sandwiched in between in the prior art technologies, this type of capacitive load is not created in the present invention because the pixel electrodes and common electrodes are arranged together on a single device-stacking substrate. This serves to increase the operating speed of the display devices and reduce their power consumption.

The invention also provides a structure which solves the problem related to limitations in the viewing field of an LCD device.

Furthermore, the invention provides a solution to the problem associated with application of electric fields in directions parallel to the substrates of the LCD device. More particularly, the invention provides a structure which prevents a gate line or a source line, or both, from being arranged side by side with a pixel electrode (or first electrode) connected to a drain of a thin-film transistor in each pixel in order to suppress voltage disturbances of the pixel electrodes. This makes it possible to present a clear-cut image.

The display devices of this invention can therefore be used as space light modulators, for instance, which are required to provide a high-definition visual display.

DETAILED DESCRIPTION OF THE PREFERRED EMBODIMENTS

Display devices according to this invention are so constructed that individual pixel electrodes are arranged on a single substrate which is placed parallel to a facing substrate.

A basic structure employed in the invention is now briefly described with reference to a first embodiment thereof depicted in FIG. 1, for instance.

Figure 1:
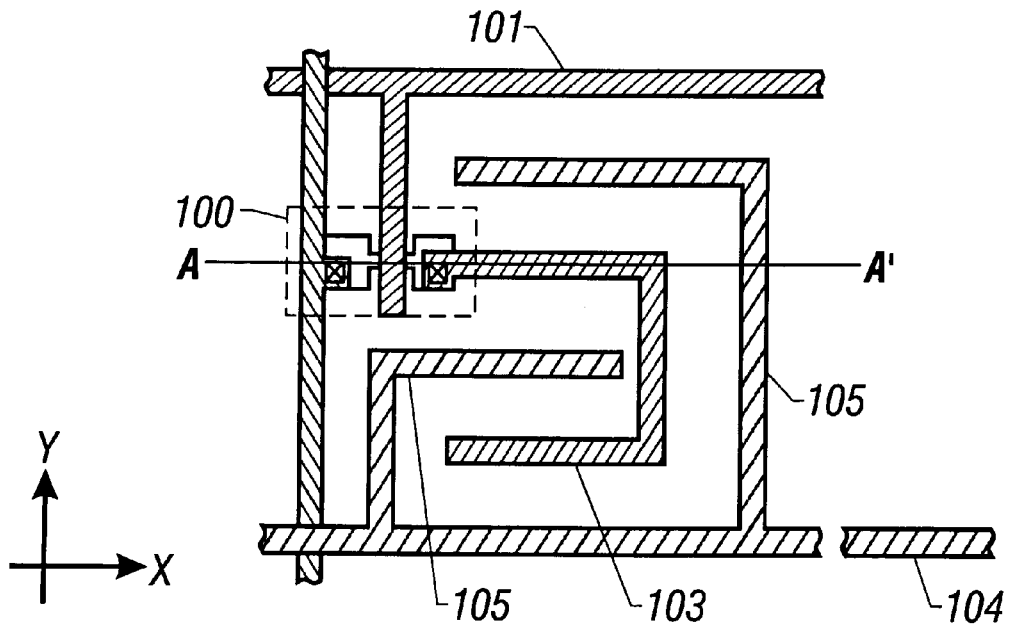
FIG. 1 is a top view illustrating a pixel layout according to a first embodiment of the invention.

Shown in FIG. 1 is one of pixels of an active matrix LCD device comprising gate lines 101 and source lines 102 which form together a grid pattern on a substrate 201. Each pixel includes a thin-film transistor 100 having a gate connected to a gate line 101 and a source connected to a source line 102, a first electrode (also referred to as the pixel electrode) 103 connected to a drain of the thin-film transistor 100, a common line 104 which is maintained at a specified voltage, and a pair of second electrodes (also referred to as the common electrodes) 105 which branch out from the common line 104.

As can be seen from FIG. 1, the first and second electrodes 103, 105 are arranged into spiral form in each pixel with their arms wound around each other. Alternatively, the first and second electrodes 103, 105 may be so arranged that their arms lie in spaces between each other's arms.

In the structure shown in FIG. 1, it is preferable that the first and second electrodes 103, 105 be formed in a common plane for aligning main components of electric fields parallel to the substrate 201. The first and second electrodes 103, 105 need not necessarily exist in a single layer, but may be formed in different layers separated by an insulating layer.

In this invention, it is desirable that first and second electrodes be formed on a single substrate and each of the first electrodes connected to a thin-film transistor be arranged in such a way that it is protected from interference from electric fields produced by source lines or gate lines, or both.

In order to keep the first electrodes unaffected by the interference from the electric fields, it is preferable that the second electrodes have such segments that are located at least in gaps between the first electrodes and the source lines or between the first electrodes and the gate lines on the same substrate.

The first embodiment shown in FIG. 1 is a practicable example of such circuit arrangement. It can be seen that one each second electrode 105 is arranged in a gap between the first electrode 103 and the source line 102, and in a gap between the first electrode 103 and the gate line 101, on the substrate 201.

Figure 12:
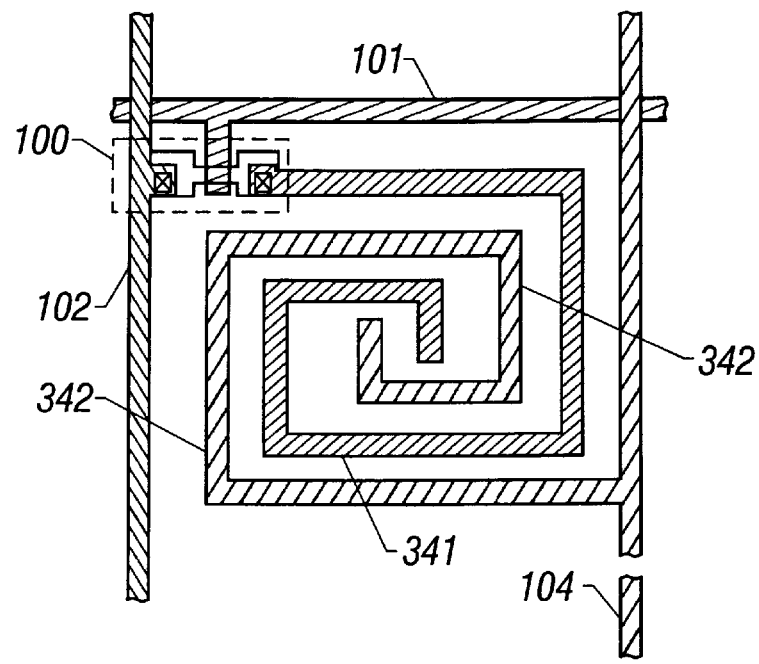
FIG. 12 is a top view illustrating a pixel layout according to a sixth embodiment of the invention.

FIG. 12 shows another practicable example of the aforementioned circuit arrangement, in which a second electrode (also referred to as the common electrode) 342 has at least one line segment located in a gap between a first electrode (also referred to as the pixel electrode) 341 and a source line 102 on a single substrate.

Figure 13:
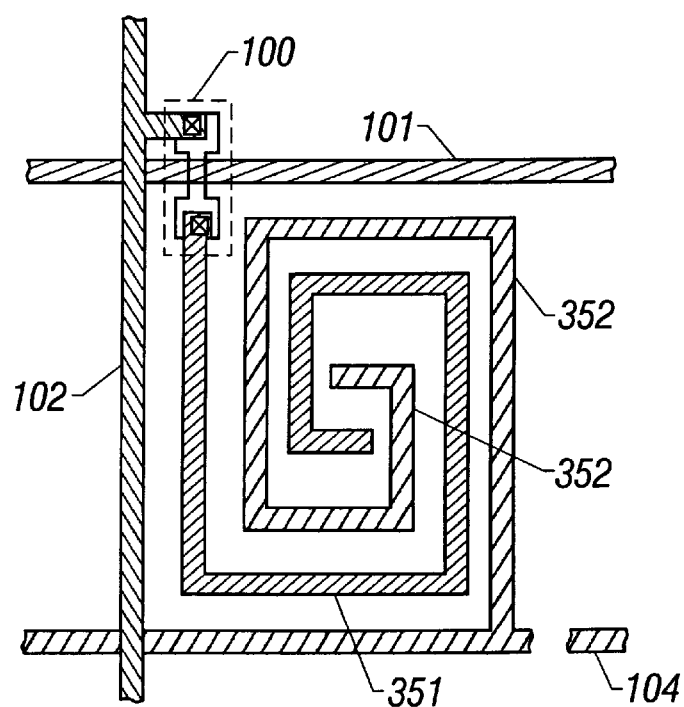
FIG. 13 is a top view illustrating a pixel layout according to a seventh embodiment of the invention.

FIG. 13 shows still another practicable example of the aforementioned circuit arrangement, in which a second electrode (also referred to as the common electrode) 352 has at least one line segment located in a gap between a first electrode (also referred to as the pixel electrode) 351 and a gate line 101 on a single substrate.

First Embodiment

The first embodiment of the invention is now described in further detail. FIG. 1 is a top view generally illustrating a pixel layout of an active matrix LCD device according to the first embodiment of the invention, and FIG. 2 is a general cross-sectional view taken along line A-A' shown in FIG. 1.

Figure 2:
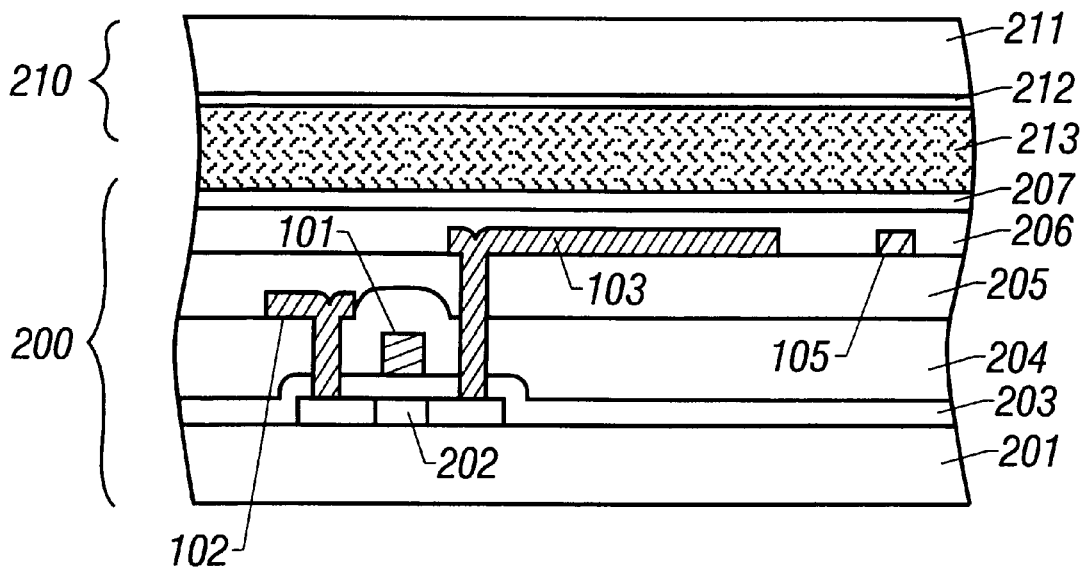
FIG. 2 is a cross-sectional view taken along line A-A' shown in FIG. 1.

As shown in FIG. 2, a device-stacking substrate 200 of the LCD device has a multi-layer structure including a plate of glass or quartz which constitutes the aforementioned substrate 201, an active layer 202 forming a silicon layer of each thin-film transistor 100, a gate insulating film 203 made of a silicon dioxide layer, for example, and the earlier mentioned gate lines (also referred to as the scan lines) 101 connected to the gate of each thin-film transistor 100, vertically stacked, or deposited, one on top of another. A first interlayer dielectric film 204 made of a silicon dioxide layer, for example, is layered on top of the gate insulating film 203 and the gate lines 101, contact holes for the source and drain of each thin-film transistor 100 (or active layer 202) are formed in the first interlayer dielectric film 204, and the previously mentioned source lines 102 connected to the source of each thin-film transistor 100 are created. Then, a second interlayer dielectric film 205 is created, contact holes for the drain of each thin-film transistor 100 are made in the first interlayer dielectric film 204, and the square spiral-shaped pixel electrodes 103 connected to individual drains, the common lines 104 and the square spiral-shaped common electrodes 105 which branch out from the individual common lines 104 are formed on the second interlayer dielectric film 205. Further created on top of these conductor lines and electrodes are a protective layer 206 and an orientation layer 207 in this order.

On the other hand, a facing substrate 210 which is placed on the opposite side of the device-stacking substrate 200 includes a plate of glass or quartz constituting a substrate 211 and an orientation layer 212 formed on a surface of the substrate 211. The device-stacking substrate 200 and the facing substrate 210 are joined together parallel to each other by means of a sealing material (not shown) with their orientation layers 207 and 212 directed inward, and a liquid crystal material 213 is filled into the gap between the two substrates 200 and 210.

Figure 3:
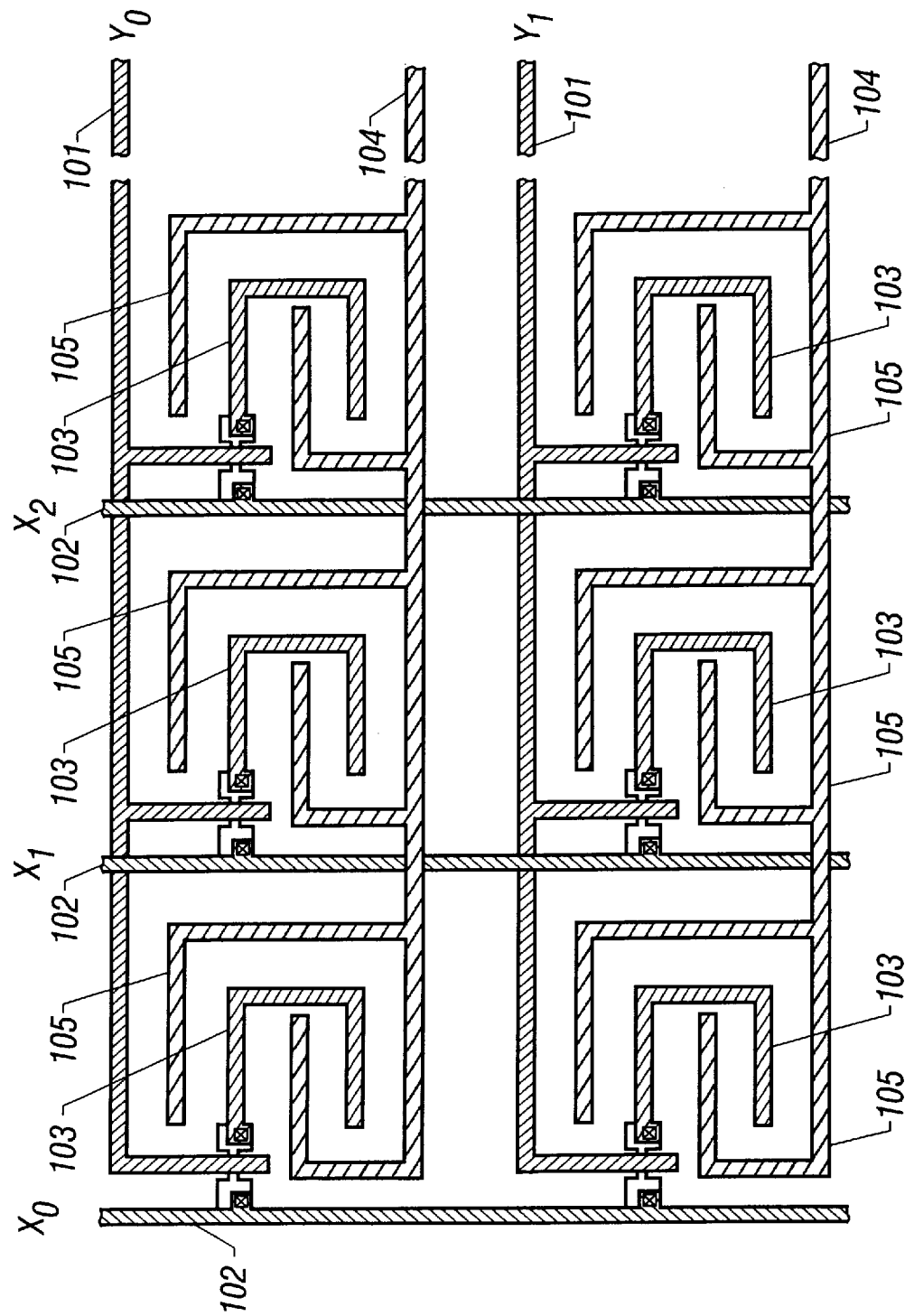
FIG. 3 is a general wiring diagram of an active matrix LCD device according to the first embodiment.
Figure 4:
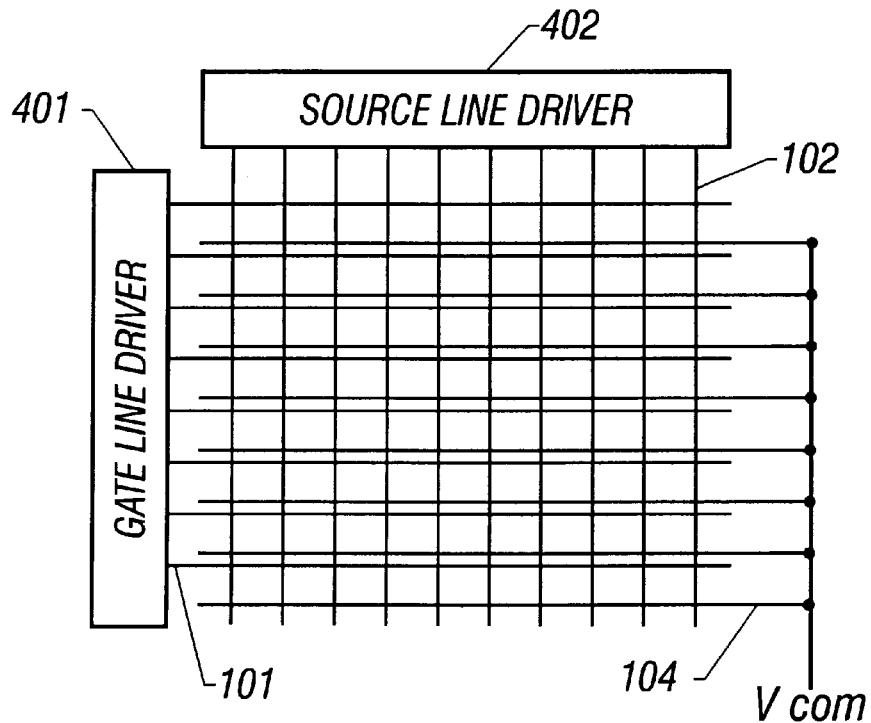
FIG. 4 is a block diagram of a device-stacking substrate according to the first embodiment.

FIG. 3 is a general wiring diagram of the active matrix LCD device according to the first embodiment, in which the individual electrodes and conductor lines are arranged in matrix form, and FIG. 4 is a block diagram of the device-stacking substrate 200.

As shown in FIG. 4, the individual gate lines 101 and source lines 102 are arranged at right angles to each other to form a rectangular grid. The gate lines 101 are connected to a gate line driver 401 while the source lines 102 are connected to a source line driver 402. In addition, the individual common electrodes 105 are connected to the respective common lines 104. Since the common lines 104 are maintained at the specified voltage Vcom, all the common electrodes 105 are held at this fixed voltage Vcom. The voltage Vcom may be set to the ground potential, for instance.

As shown in FIG. 1, the pixel electrode 103 connected to the drain of each thin-film transistor 100 is routed between the square spiral-shaped common electrodes 105 branching out from one of the common lines 104, wherein the distances between the pixel electrode 103 and the common electrodes 105 are made equal in the X-axis and Y-axis directions.

In the structure shown in FIG. 1, each pixel includes a pair of common electrodes 105 and one pixel electrode 103 arranged in square spiral form. When a particular pixel is driven to provide a visual display of information, electric fields are produced between the pixel electrode 103 and the common electrodes 105 and such electric fields are applied to the liquid crystal material 213 within the pixel.

Since the pixel electrode 103 and the common electrodes 105 of each pixel are located in a common plane as shown in FIG. 2, main components of the electric fields are mostly oriented in a direction parallel to a surface of the substrate 201 so that individual molecules of the liquid crystal material 213 are subjected to a force parallel to the substrate 201. It is therefore possible to rotate the molecules by controlling the electric fields created between the individual pixel electrodes 103 and the common electrodes 105 and provide a visual display as a result of variations in electro-optical properties caused by the rotation of the molecules of the liquid crystal material 213.

It can be seen in FIG. 1 that the pixel electrode 103 connected to the drain of each thin-film transistor 100 is surrounded, or fenced off, by the common electrodes 105 from the nearby gate line 101 and the source line 102. This arrangement makes it possible to keep the pixel electrodes 103 unaffected from the gate lines 101 and source lines 102 and thereby present a clear-cut image without smearing or bleeding around the individual pixels.

Furthermore, the structure shown in FIG. 1 is characterized in that ends of the electrodes 103 and 105 are less susceptible to interference from surrounding circuit elements since the electrodes 103 and 105 are arranged in spiral (swirl) form extending toward a central region of each pixel. This is because the ends of the individual electrodes 103 and 105 exist in the central region of each pixel, where the influence of surrounding electric fields is minimal.

In this embodiment, the pixel electrodes 103 and the common electrodes 105 are formed in the same layer as shown in FIG. 2 because they do not cut across or overlap each other. In one variation, the pixel electrodes 103 and the common electrodes 105 may be vertically separated by an intermediate insulating layer. In this varied form of the embodiment, the strength of electric fields produced between the electrodes 103 and 105 must be sufficiently high to rotate the molecules of the liquid crystal material 213 although the pixel electrodes 103 may be formed either on top of or underneath the common electrodes 105.

Figure 5:
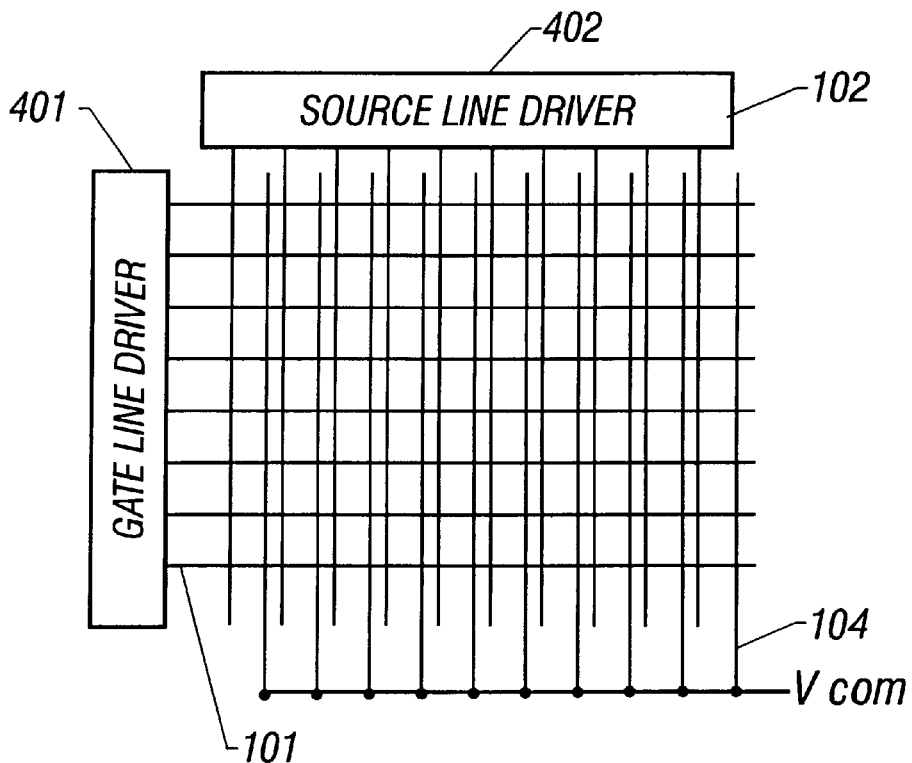
FIG. 5 is a block diagram of a device-stacking substrate according to variation of the structure of FIG. 4.

The common electrodes 105 in individual rows of pixels are connected together by the respective common lines 104 in this embodiment, as shown in FIGS. 3 and 4. The matrix structure may be varied in such a way that the common electrodes 105 in individual columns of pixels are interconnected. FIG. 5 is a block diagram illustrating an active matrix LCD device according to thus varied form of the matrix structure, in which elements equivalent to those shown in FIG. 4 are designated by the same reference numerals.

Second Embodiment

Figure 6:
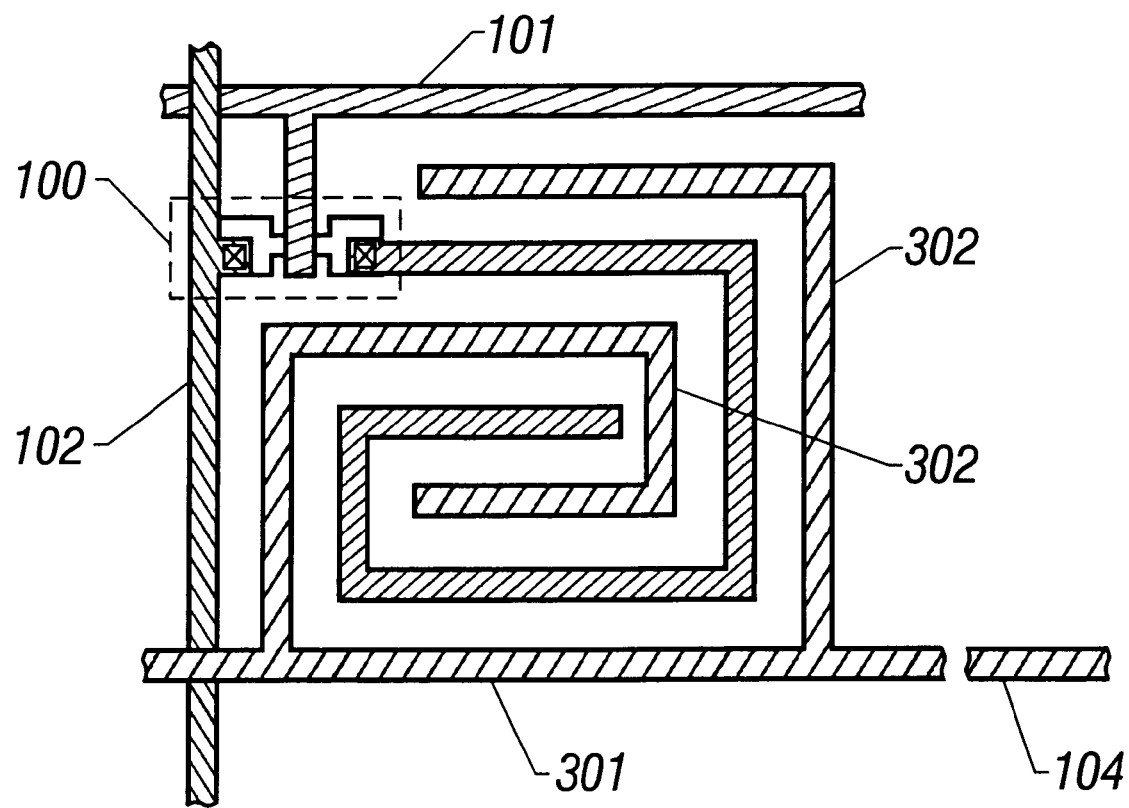
FIG. 6 is a top view illustrating a pixel layout according to a second embodiment of the invention.

A second embodiment is an improved version of the first embodiment, wherein the number of turns of each square spiral-shaped pixel electrode 301 is increased in the second embodiment. FIG. 6 is a top view generally illustrating a pixel layout of an active matrix LCD device according to the second embodiment of the invention, in which elements equivalent to those shown in FIG. 1 are designated by the same reference numerals.

The number of turns of the pixel electrode 301 in a pixel shown in FIG. 6 is increased from that of the pixel electrode 103 shown in FIG. 1. The total number of turns of a pair of common electrodes 302 in the pixel is correspondingly increased to ensure that the pixel electrode 301 is surrounded, or flanked, by the common electrodes 302 and the pixel electrode 301 does not run side by side with any gate line 101 or source line 102.

Third Embodiment

In the first embodiment shown in FIG. 1, the electric fields produced between the pixel electrode 103 and the common electrodes 105 include two components, one directed along the X-axis and the other directed along the Y-axis in the plane of the page of FIG. 1. For this reason, the molecules of the liquid crystal material 213 are not uniformly directed in a particular direction. It is therefore difficult to utilize a commonly used polarizing plate which has a single direction of linear polarization. Instead, a special polarizing plate having different directions of polarization at different locations is required and alignment of such a special polarizing plate is remarkably difficult.

A third embodiment described below is a varied form of the first embodiment devised to provide a solution to the aforementioned problem, making it possible to employ a commonly used polarizing plate having a single direction of linear polarization.

Figure 7:
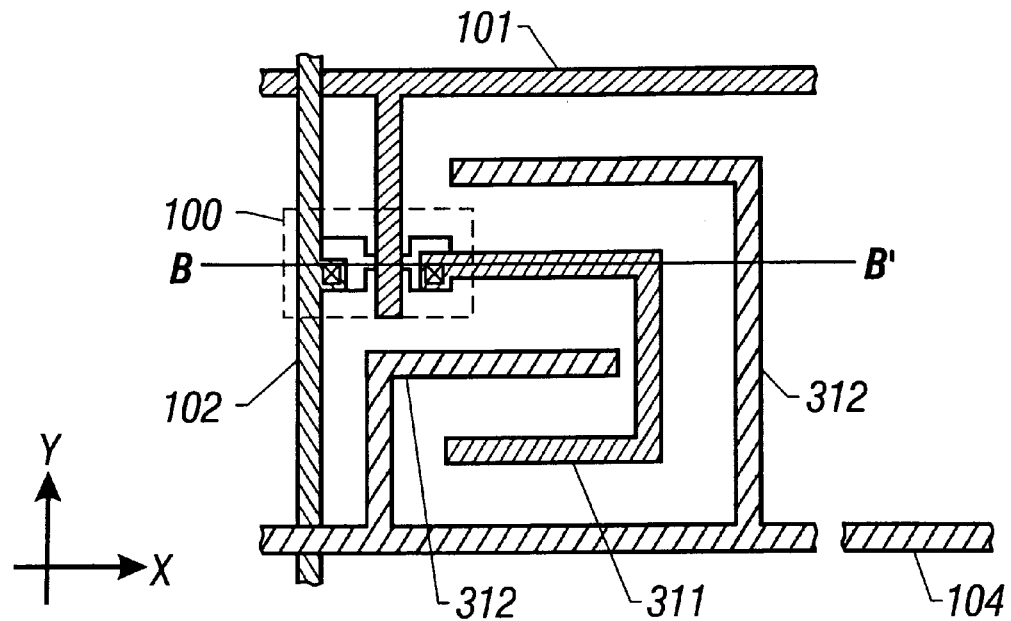
FIG. 7 is a top view illustrating a pixel layout according to a third embodiment of the invention.
Figure 8:
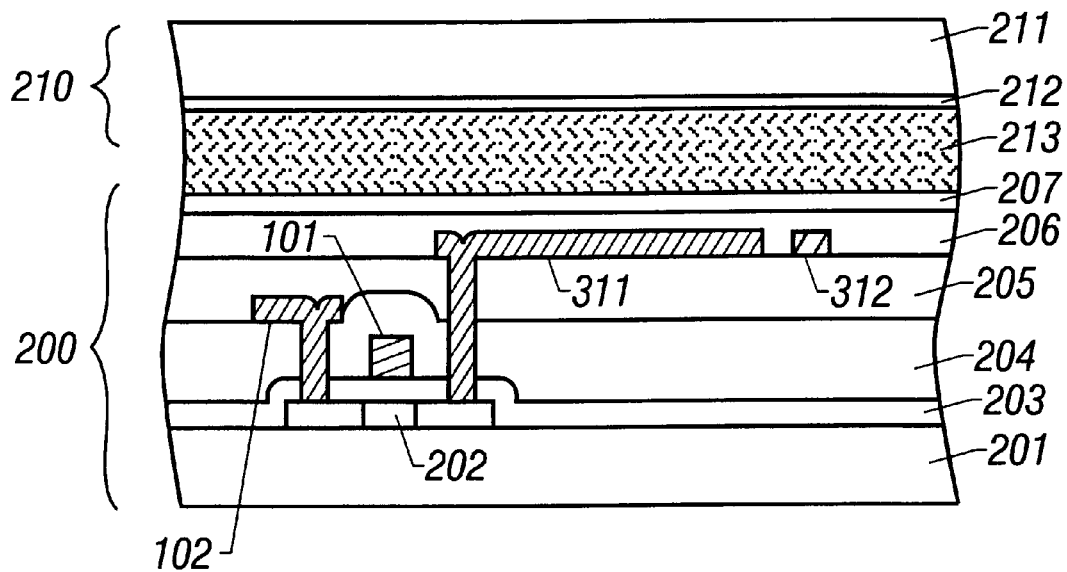
FIG. 8 is a cross-sectional view taken along line B-B' shown in FIG. 7.

FIG. 7 is a top view generally illustrating a pixel layout of an active matrix LCD device according to the third embodiment of the invention, and FIG. 8 is a general cross-sectional view taken along line B-B' shown in FIG. 7. In FIGS. 7 and 8, elements equivalent to those shown in FIGS. 1 and 2 are designated by the same reference numerals.

This embodiment is characterized in that the arrangement of a pixel electrode 311 and common electrodes 312 of each pixel in a device-stacking substrate 200 is slightly altered from that of the pixel electrode 103 and common electrodes 105 of the first embodiment. Although the pixel electrode 103 and common electrodes 105 of each pixel are arranged with the same distance, or line interval, in the X-axis and Y-axis directions in the first embodiment, the distance between the pixel electrode 311 and the common electrodes 312 is made partially smaller in the X-axis direction in the third embodiment. The other elements of the third embodiment are arranged in the same way as the first embodiment.

As the distance between the individual electrodes 311, 312 is differentiated in this manner, electric fields produced between the pixel electrode 311 and the common electrodes 312 are mostly parallel to the surface of the device-stacking substrate 200 and a Y-component of the electric fields becomes most dominant. With this arrangement, an electric field can be applied to a liquid crystal material 213 in a direction parallel to the surface of the device-stacking substrate 200 and rotary axes of individual molecules of the liquid crystal material 213 can be uniformly oriented so that it becomes possible to employ the commonly used polarizing plate having a single linear polarization direction. Furthermore, as the distance between the pixel electrode 311 and the common electrodes 312 is partially reduced, the aperture ratio of each pixel is increased and the electrodes 311, 312 with reduced spaces can be used as an auxiliary capacitor connected in parallel with each pixel.

The capacitance of this auxiliary capacitor is determined by the total length of line segments where the pixel electrode 311 and the common electrodes 312 run close to each other. It is therefore possible to controllably set the capacitance of the auxiliary capacitor by choosing a proper number of turns of the common electrodes 312. In the pixel shown in FIG. 6, for example, the total length of closely paralleled segments of the pixel electrode 301 and the common electrodes 302 may be increased by reducing their intervals in the X-axis direction so that a large auxiliary capacitance is produced.

Fourth Embodiment

Figure 9:
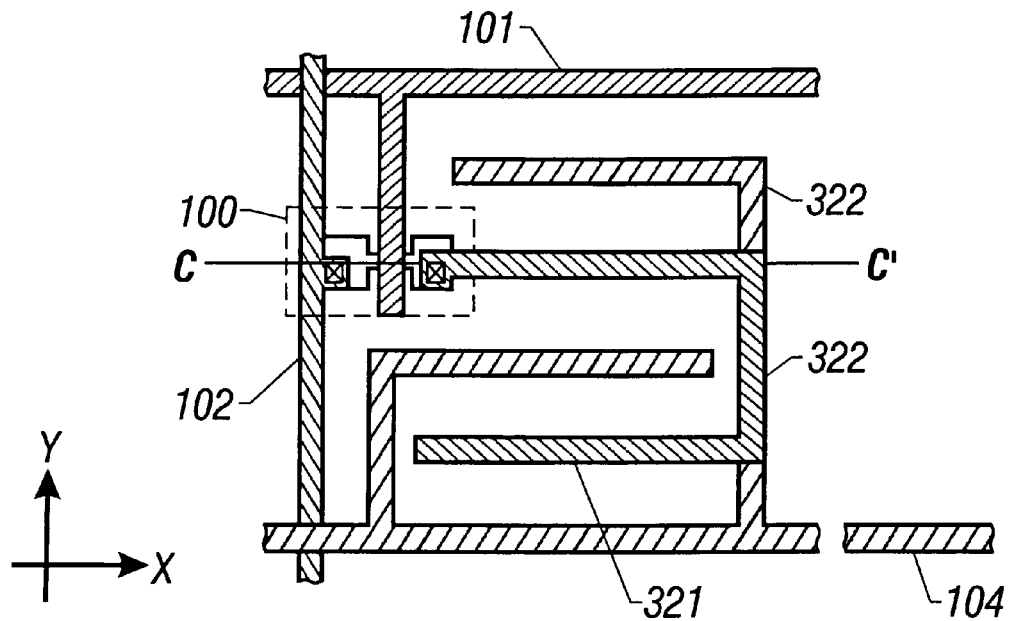
FIG. 9 is a top view illustrating a pixel layout according to a fourth embodiment of the invention.
Figure 10:
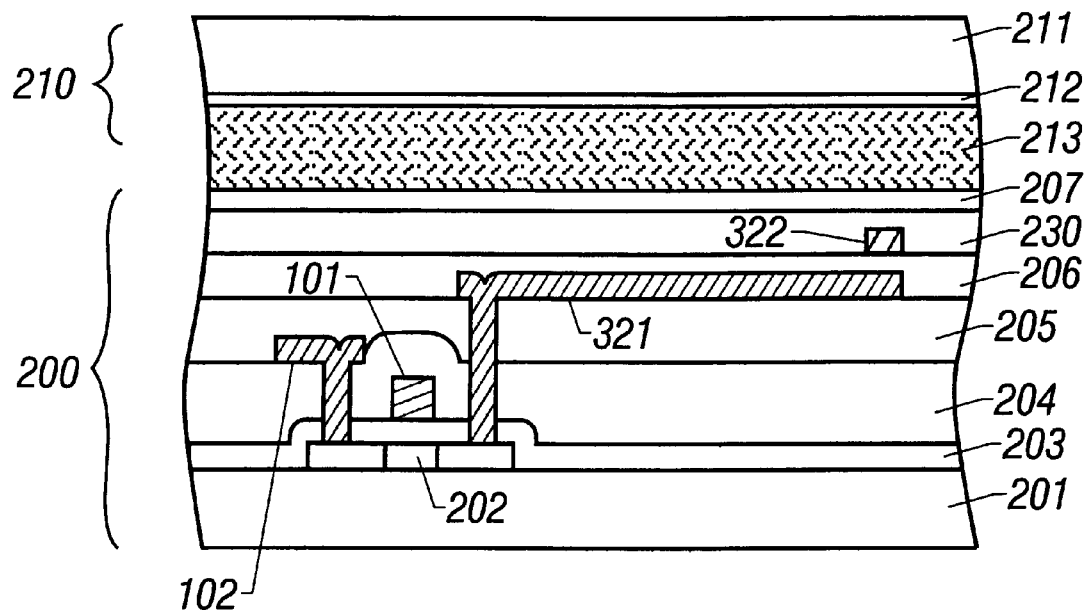
FIG. 10 is a cross-sectional view taken along line C-C' shown in FIG. 9.

A fourth embodiment is one variation of the third embodiment particularly intended to provide an increased aperture ratio. FIG. 9 is a top view generally illustrating a pixel layout of an active matrix LCD device according to the fourth embodiment of the invention, and FIG. 10 is a general cross-sectional view taken along line C-C' shown in FIG. 9. In FIGS. 9 and 10, elements equivalent to those shown in FIGS. 1 and 2 are designated by the same reference numerals.

While the distance between the pixel electrode 311 and the right-hand common electrode 312 is reduced in the X-axis direction in the third embodiment, the distance between a pixel electrode 321 and one of common electrodes 322 is further reduced in the X-axis direction in this fourth embodiment up to a point where a line segment of the pixel electrode 321 overlaps the right-hand common electrode 322.

To allow for overlapping between the pixel electrode 321 and the right-hand common electrode 322 without causing short circuit, the pixel electrode 321 and the common electrodes 322 are vertically separated by a third interlayer dielectric film 230 as shown in FIG. 10. Although the common electrodes 322 are located above the pixel electrode 321, they may be positioned in an opposite up/down relationship.

The distance between the individual electrodes 321, 322 is reduced in the X-axis direction in this embodiment in a similar way to the second embodiment. As a result, electric fields produced between the pixel electrode 321 and the common electrodes 322 are made parallel to the surface of a device-stacking substrate 200, wherein a Y-component is most dominant in the electric fields while an X-component thereof is almost negligible. With this arrangement, an electric field can be applied to a liquid crystal material 213 in a direction parallel to the surface of the device-stacking substrate 200 and rotary axes of individual molecules of the liquid crystal material 213 can be uniformly oriented so that it becomes possible to employ the commonly used polarizing plate having a single linear polarization direction.

Furthermore, the overlapped portions of the electrodes 321 and 322 work together as an auxiliary capacitor. Since the distance between the pixel electrode 321 and the right-hand common electrode 322 is further reduced compared to the third embodiment by partially overlapping each other, the aperture ratio of each pixel is even more increased.

Fifth Embodiment

Figure 11:
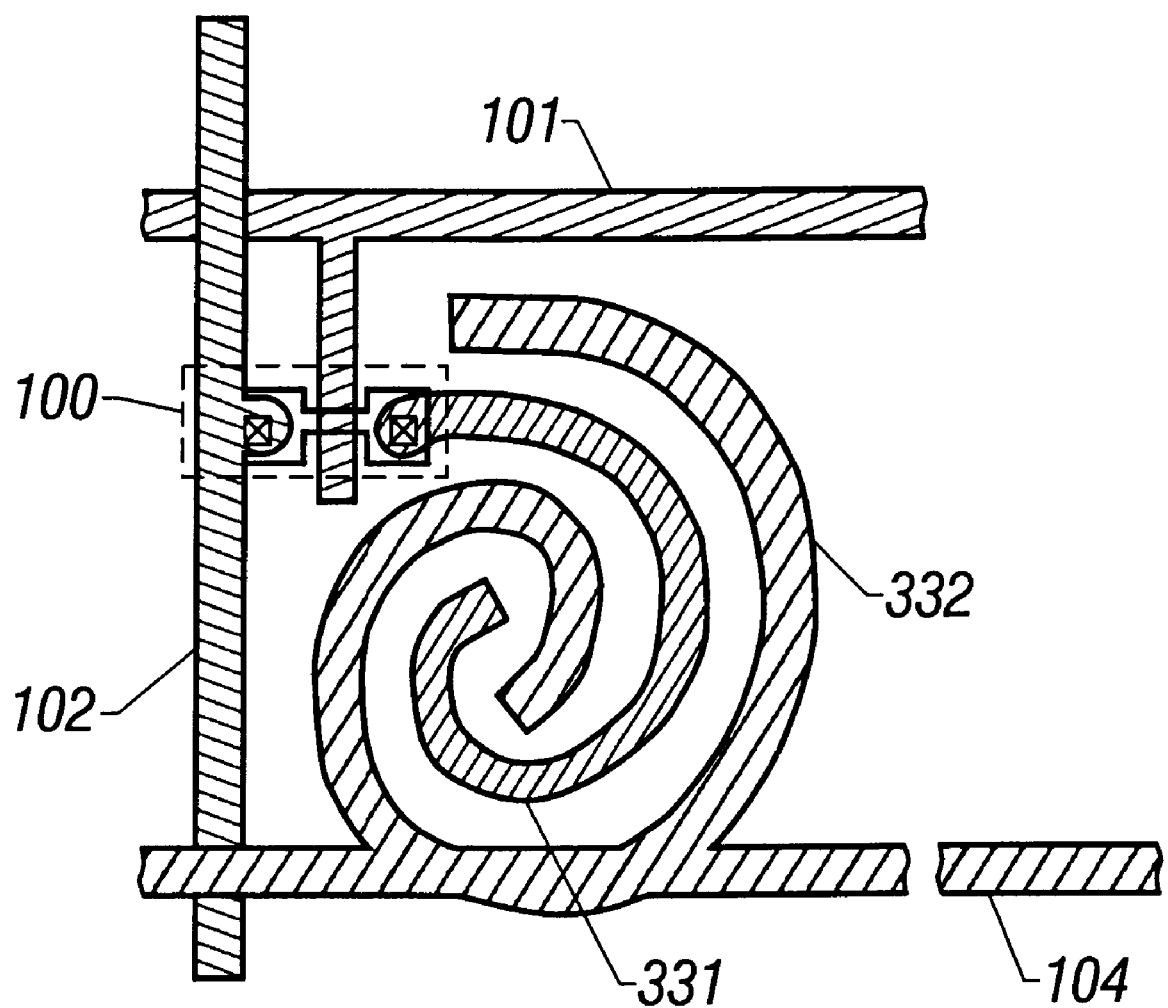
FIG. 11 is a top view illustrating a pixel layout according to a fifth embodiment of the invention.

FIG. 11 generally illustrates a pixel structure according to a fifth embodiment of the invention. The pixel structure of this embodiment is characterized in that a pixel electrode 331 connected to a drain of a thin-film transistor 100 and a common electrode 332 branching out from a common line 104 are arranged to form double spiral curves, rather than square spirals.

In FIG. 11, elements equivalent to those shown in FIG. 1 are designated by the same reference numerals. More specifically, the elements other than the pixel electrode 331 and the common electrode 332 are configured in the same way as the first embodiment. Individual gate lines 101, source lines 102 and common lines 104 are therefore arranged to form together a rectangular grid, as shown in FIG. 4.

The structure shown in FIG. 11 makes it possible to produce a uniform electric field between the pixel electrode 331 and the common electrode 332 as their spiral pattern does not contain any perpendicularly bent portions.

Sixth Embodiment

A basic design implemented in the first to fifth embodiments hereinbefore discussed is that a common electrode is located in a gap between each pixel electrode and a nearby source line while another common electrode is located in a gap between each pixel electrode and a nearby gate line.

Embodiments to be discussed in the following are based on such a design concept that a common electrode is located in a gap between each pixel electrode and a nearby source line or in a gap between each pixel electrode and a nearby gate line to ensure that no pixel electrode runs side by side with both a source line and a gate line. Although each pixel electrode would be affected by an electric field produced by a source line or a gate line, this design is advantageous in that the area occupied by each common electrode can be reduced, resulting in an increase in effective display area.

A sixth embodiment of the invention is based on such a structure that a common electrode is located in a gap between each pixel electrode and a nearby source line. FIG. 12 is a top view generally illustrating a pixel layout according to the sixth embodiment, in which elements equivalent to those shown in FIG. 1 are designated by the same reference numerals.

In this embodiment, gate lines 101 and source lines 102 are connected to individual thin-film transistors 100, forming a rectangular grid. In FIG. 12, a square spiral-shaped pixel electrode 341 is connected to a drain of each thin-film transistor 100 while a common electrode 342 branches out from a nearby common line 104 set to a specified voltage, forming a square spiral shape similar to the pixel electrode 341.

In the structure shown in FIG. 12, each pixel comprises one each pixel electrode 341 and common electrode 342. A combination of these electrodes 341, 342 forms electric fields to be applied to a liquid crystal material 213 contained in each pixel, in which main components of the electric fields are oriented parallel to a device-stacking substrate. In this configuration, the pixel electrode 341 is fenced off from a nearby source line 102 by the common electrode 342 branching out from the nearby common line 104 which is held at the specified voltage so that the pixel electrode 341 does not run side by side with the source line 102. The voltage applied to the individual common lines 104 may be set to any proper level, such as the ground potential, for instance.

The above structure makes it possible to keep the pixel electrodes 341 unaffected from the source lines 102 and thereby present a clear-cut image without smearing or bleeding around the individual pixels.

In this embodiment, the pixel electrode 341 connected to the drain of the thin-film transistor 100 and the common electrode 342 branching out from the nearby common line 104 are arranged in the same plane in each pixel in such a way that their line segments wind around each other, forming together a double square spiral pattern. Neighboring line segments of the electrodes 341 and 342 are spaced generally equidistant from each other along their lengths and the electric fields are formed between their neighboring line segments.

The main components of the electric fields are oriented parallel to the device-stacking substrate as stated above so that individual molecules of the liquid crystal material 213 are subjected to forces directed parallel to the device-stacking substrate. The liquid crystal molecules are rotated by controlling intensities of the electric fields. Rotary motion of the liquid crystal molecules thus created varies electro-optical properties of the liquid crystal material 213, making it possible to provide a visual display of information.

The structure shown in FIG. 12 is characterized in that ends of the electrodes 341 and 342 are less susceptible to interference from surrounding circuit elements since the electrodes 341 and 342 are arranged in spiral form extending toward a central region of each pixel. This is because the ends of the individual electrodes 341 and 342 exist in the central region of each pixel, where the influence of surrounding electric fields is minimal.

An active matrix LCD device made by arranging a plurality of pixels shown in FIG. 12 in matrix form is wired as depicted in FIG. 5.

Seventh Embodiment

A seventh embodiment of the invention is based on such a structure that a common electrode is located in a gap between each pixel electrode and a nearby gate line. FIG. 13 is a top view generally illustrating a pixel layout according to the seventh embodiment, in which elements equivalent to those shown in FIG. 1 are designated by the same reference numerals.

In this embodiment, gate lines 101 and source lines 102 are connected to individual thin-film transistors 100, forming a rectangular grid. In FIG. 13, a square spiral-shaped pixel electrode 351 is connected to a drain of each thin-film transistor 100 while a common electrode 352 branches out from a nearby common line 104 set to a specified voltage, forming a square spiral shape similar to the pixel electrode 351.

In the structure shown in FIG. 13, each pixel comprises one each pixel electrode 351 and common electrode 352 which are arranged side by side with and spaced generally equidistant from each other on one device-stacking substrate. A combination of these electrodes 351, 352 forms electric fields to be applied to a liquid crystal material 213 contained in each pixel, in which main components of the electric fields are oriented parallel to the device-stacking substrate. The device-stacking substrate of this embodiment has the same configuration as shown in FIG. 4.

In this configuration, the pixel electrode 351 is fenced off from a nearby gate line 101 by the common electrode 352 branching out from the nearby common line 104 which is held at the specified voltage so that the pixel electrode 351 does not run side by side with the gate line 101. The voltage applied to the individual common lines 104 may be set to any proper level, such as the ground potential, for instance.

The above structure makes it possible to keep the pixel electrodes 351 unaffected and thereby present a clear-cut image without smearing or bleeding around the individual pixels.

Eighth Embodiment

Figure 14:
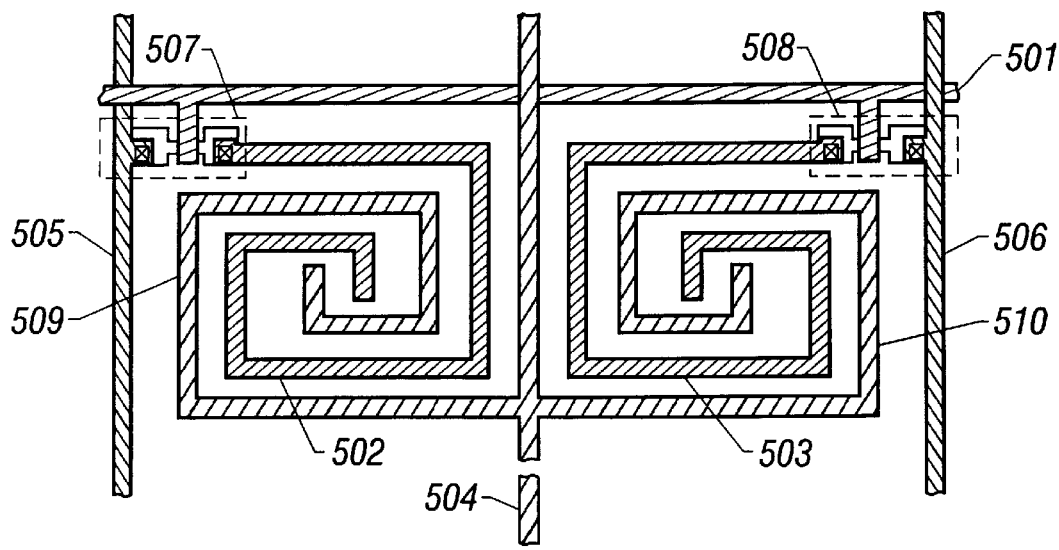
FIG. 14 is a top view illustrating a pixel layout according to an eighth embodiment of the invention.
Figure 16:
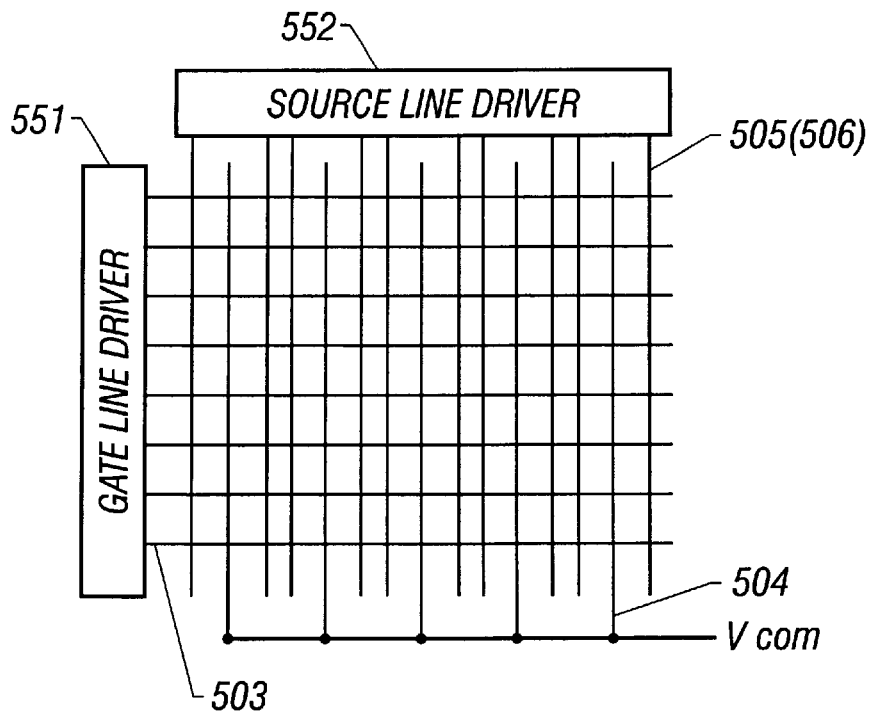
FIG. 16 is a block diagram of a device-stacking substrate according to the eighth embodiment.

An eighth embodiment of the invention is characterized by a reduced number of common lines compared to the structure of the sixth embodiment. FIG. 14 is a top view generally illustrating a pixel layout according to the eighth embodiment, and FIG. 16 is a block diagram of a device-stacking substrate of this embodiment.

FIG. 14 shows a general layout of a pair of pixels. In this structure, one pixel includes a thin-film transistor 507 while the other pixel includes a thin-film transistor 508. Gates of the two thin-film transistors 507 and 508 are connected to a common gate line 501 while their sources are connected to respective source lines 505 and 506. Connected to drains of the thin-film transistors 507 and 508 are pixel electrodes 502 and 503, respectively. Designated by the numeral 551 in FIG. 16 is a gate line driver and designated by the numeral 552 is a source line driver.

In the structure shown in FIG. 14, a common line designated by the numeral 504 is shared by two adjacent columns of pixels. It can be seen in FIG. 14 that common electrodes 509 and 510 branching out from the common line 504 are arranged side by side with and spaced generally equidistant from the pixel electrodes 502 and 503, respectively. With this arrangement, electric fields parallel to a device-stacking substrate are formed between the electrodes 502 and 509, and between the electrodes 503 and 510, making it possible to provide a visual display of information.

Since each common line 504 is shared by two adjacent columns of pixels in this embodiment, the number of common lines 504 is made half the total number of source lines 505 and 506. This will be easily understood from a comparison between the block diagrams shown in FIGS. 5 and 16.

Although the pixel electrodes 502 and 503 and the common electrodes 509 and 510 of this embodiment are formed into the same patterns as or bilaterally symmetrical to those shown in the sixth embodiment, they may be shaped into the same patterns as or bilaterally symmetrical to those described in any of the first to fifth embodiments as long as each pixel electrode is arranged so that it does not run side by side with a nearby gate line or source line.

Furthermore, the structure of FIG. 14 may be modified in such a way that additional common electrodes branching out from the common line 504 may be routed between the pixel electrodes 502 and 503 and the gate line 501 to avoid their close parallel runs.

Ninth Embodiment

Figure 15:
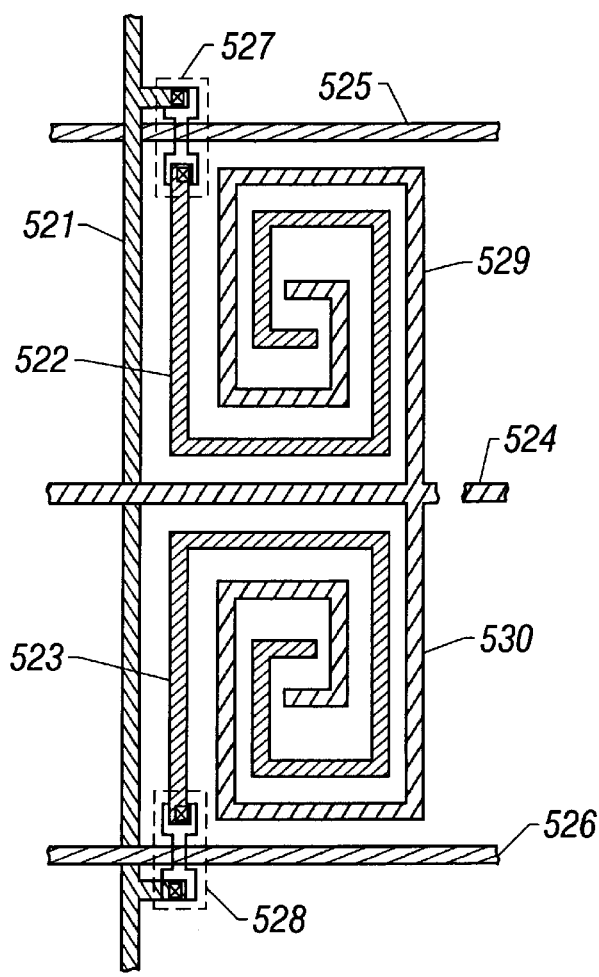
FIG. 15 is a top view illustrating a pixel layout according to a ninth embodiment of the invention.
Figure 17:
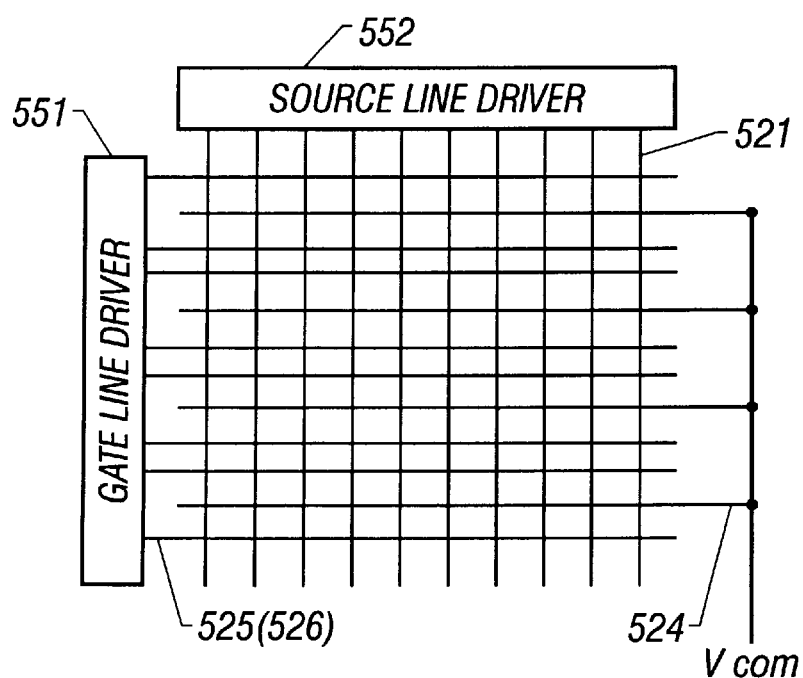
FIG. 17 is a block diagram of a device-stacking substrate according to the ninth embodiment.

A ninth embodiment of the invention is characterized by a reduced number of common lines compared to the structure of the seventh embodiment. FIG. 15 is a top view generally illustrating a pixel layout according to the ninth embodiment, and FIG. 17 is a block diagram of a device-stacking substrate of this embodiment.

FIG. 15 shows a general layout of a pair of pixels. In this structure, one pixel includes a thin-film transistor 527 while the other pixel includes a thin-film transistor 528. Sources of the two thin-film transistors 527 and 528 are connected to a common source line 521 while their gates are connected to respective gate lines 525 and 526. Connected to drains of the thin-film transistors 527 and 528 are pixel electrodes 522 and 523, respectively. Designated by the numeral 551 in FIG. 17 is a gate line driver and designated by the numeral 552 is a source line driver.

In the structure shown in FIG. 15, a common line designated by the numeral 524 is shared by two adjacent rows of pixels. It can be seen in FIG. 15 that common electrodes 529 and 530 branching out from the common line 524 are arranged side by side with and spaced generally equidistant from the pixel electrodes 522 and 523, respectively. With this arrangement, electric fields parallel to a device-stacking substrate are formed between the electrodes 522 and 529, and between the electrodes 523 and 530, making it possible to provide a visual display of information.

Since each common line 524 is shared by two adjacent rows of pixels in this embodiment, the number of common lines 524 is made half the total number of source lines 521. This will be easily understood from a comparison between the block diagrams shown in FIGS. 4 and 17.

Tenth Embodiment

Figure 18:
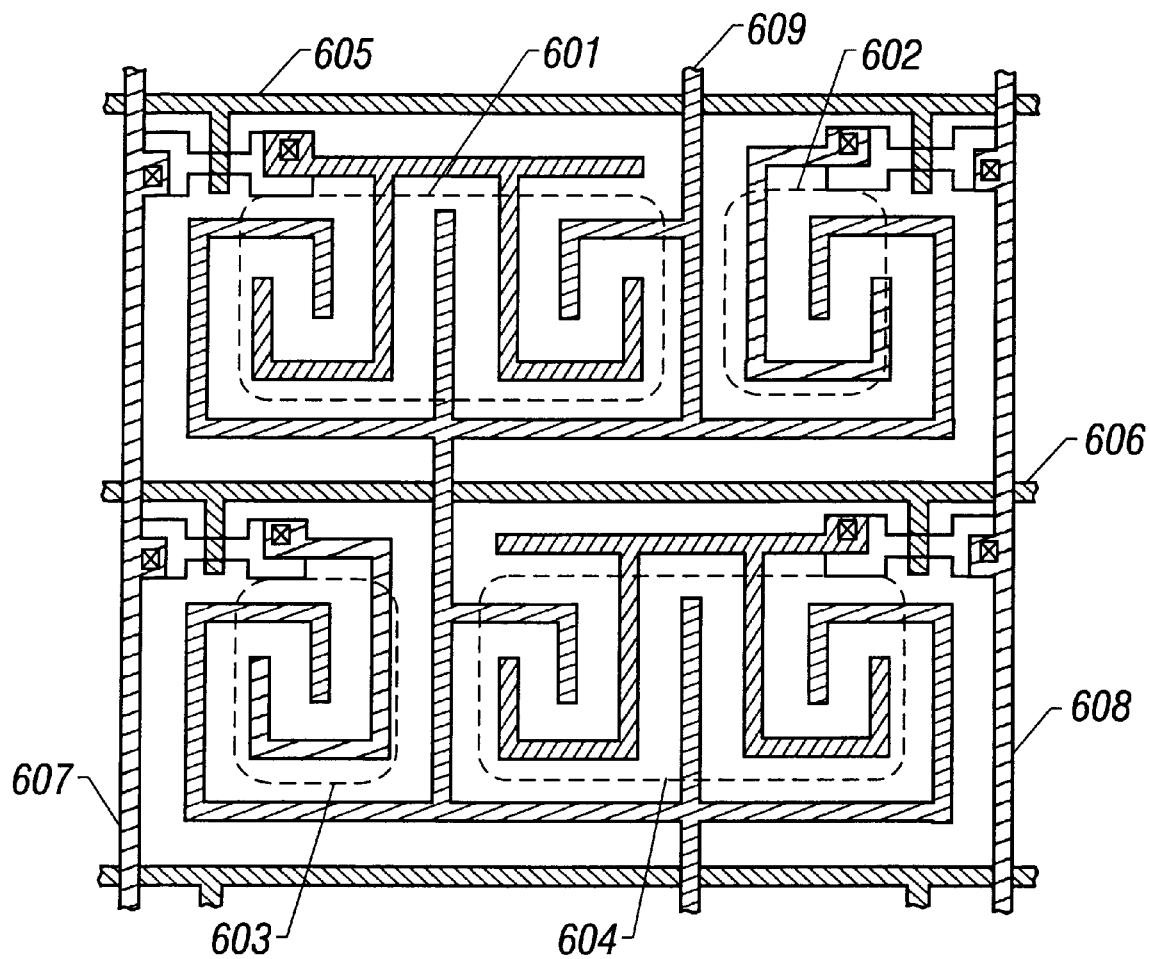
FIG. 18 is a top view illustrating a pixel layout according to a tenth embodiment of the invention.

A tenth embodiment of the invention is characterized in that two adjacent pixels 601 and 602 enclosed by gate lines 605 and 606 and source lines 607 and 608 form together a pixel unit as illustrated in FIG. 18.

The two pixels 601 and 602 can take the following four states: that is, both the pixels 601 and 602 are OFF; the pixel 601 is OFF and the pixel 602 is ON; the pixel 601 is ON and the pixel 602 is OFF; and both the pixels 601 and 602 are ON. These combinations of pixel states allow for presentation in four levels of gradation. Designated by the numerals 603 and 604 in FIG. 18 are pixels forming another pixel unit.

What is also characteristic of the configuration of FIG. 18 is that one common line 609 is shared by the four pixels 601–604 constituting each 2×2 elementary matrix. Since common electrodes of these four pixels 601–604 are individually connected to the same common line 609 in this embodiment, the total number of common lines 609 is made half the number of source lines. Therefore, the wiring pattern on a device-stacking substrate of this embodiment is the same as the eighth embodiment which is shown in FIG. 16.

It can be understood from the above discussion that the configuration of FIG. 18 serves to simplify the wiring pattern regardless of a rather complicated electrode layout.

Eleventh Embodiment

Figure 19:
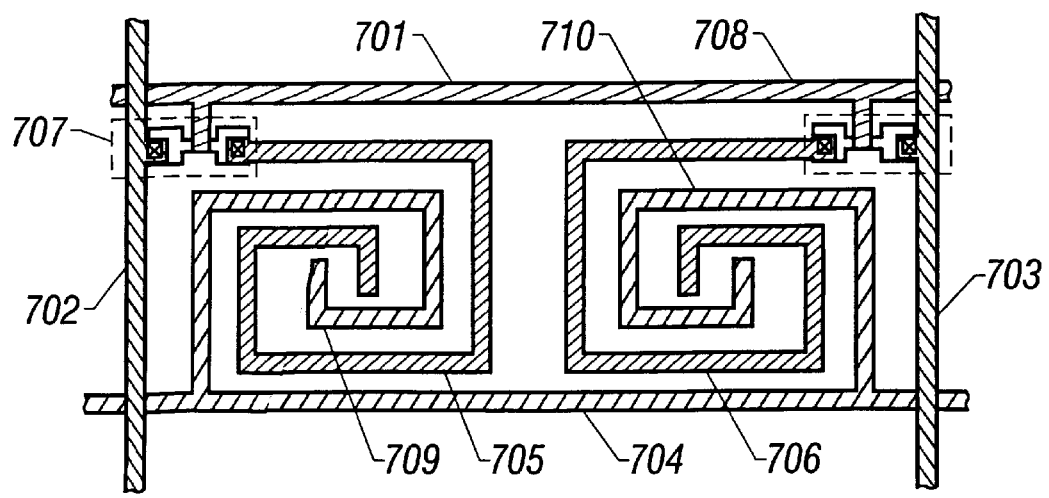
FIG. 19 is a top view illustrating a pixel layout according to an eleventh embodiment of the invention.

FIG. 19 generally illustrates a configuration of an eleventh embodiment of the invention, which is characterized in that a pair of pixel regions are located in an area enclosed by a gate line 701, source lines 702 and 703, and a common line 704.

As shown in FIG. 19, a pixel electrode 705 connected to a drain of a thin-film transistor 707 and a common electrode 709 branching out from the common line 704 are symmetrically arranged to form an electrode pair. This electrode pair constitutes one pixel region and forms electric fields oriented parallel to a device-stacking substrate.

Similarly, a pixel electrode 706 connected to a drain of a thin-film transistor 708 and a common electrode 710 branching out from the common line 704 form together another electrode pair which constitutes one pixel region. The pixel electrode 706 and the common electrode 710 produce therebetween electric fields oriented parallel to the device-stacking substrate.

In this embodiment, the common electrode 709 lies between the pixel electrode 705 and the source line 702 while the common electrode 710 lies between the pixel electrode 706 and the source line 703 so that the pixel electrode 705 and 706 do not run side by side with the source lines 702 and 703, respectively. This arrangement serves to protect the pixel electrode 705 and 706 from interference from the source lines 702 and 703 and thereby provide a satisfactory visual display.

Twelfth Embodiment

Figure 20:
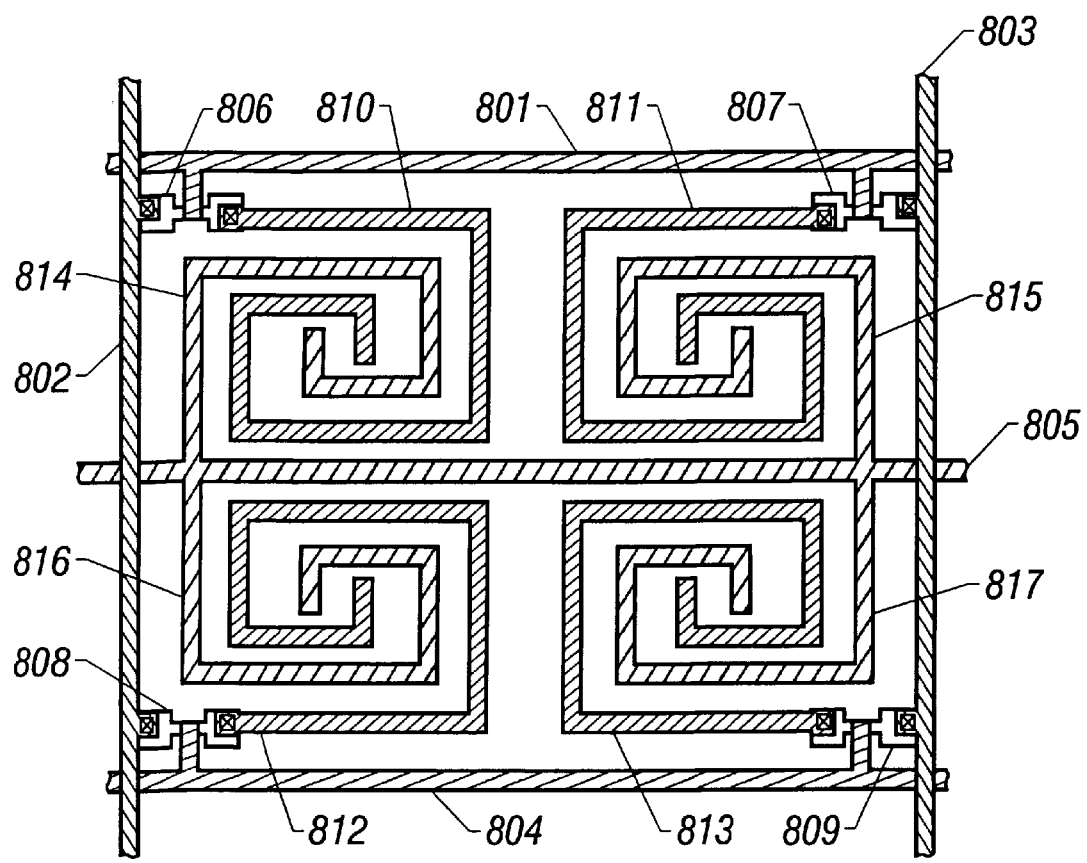
FIG. 20 is a top view illustrating a pixel layout according to a twelfth embodiment of the invention.
Figure 21:
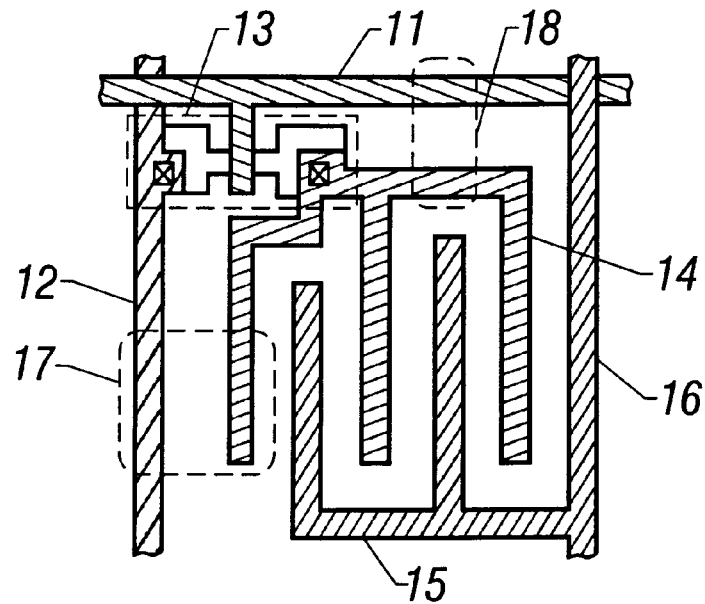
FIG. 21 is a top view illustrating a conventional pixel layout.
Figure 22:
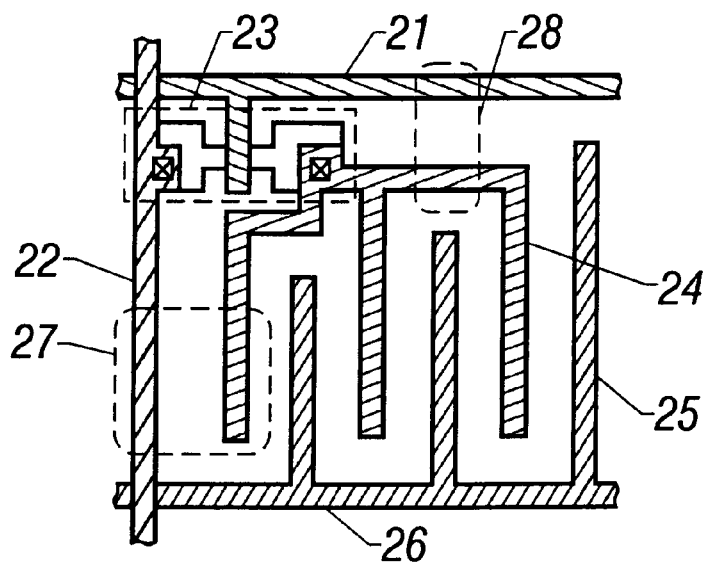
FIG. 22 is a top view illustrating another conventional pixel layout.

FIG. 20 generally illustrates a configuration of a twelfth embodiment of the invention, in which four pixel regions are located in an area enclosed by gate lines 801 and 804 and source lines 802 and 803.

Square spiral-shaped pixel electrodes 810–813 are connected to drains of four thin-film transistors 806–809, respectively, while common electrodes 814–817 branching out from a common line 805 are symmetrically arranged with the respective pixel electrodes 810–813 in the same plane to form four pixels.

These four pixels may be used either independently of one another or as a group of pixels to provide a surface gradation presentation.

Since the four pixel electrodes 810–813 are fenced off from the source lines 802 and 803 by the respective common electrodes 814–817, it is possible to provide a satisfactory visual display.

Furthermore, the common electrodes 814–817 provided on two adjacent rows of pixels are connected to one common line 805, the total number of common lines 805 is made half the number of gate lines. Therefore, the wiring pattern on a device-stacking substrate of this embodiment is the same as shown in FIG. 17.

Although the thin-film transistors employed in the foregoing embodiments are of planar type, it is possible to use other types, such as stagger type thin-film transistors. In such variations of the invention, a layering sequence of gate lines, source lines, common lines and pixel electrodes should be determined appropriately in accordance with electrode arrangement and wiring requirements of relevant thin-film transistors. These circuit elements may be arranged in the same plane as long as they do not overlap or intersect the common lines and pixel electrodes.

While the invention has thus far been described as being embodied in the LCD devices, the invention can also be applied to other types of electro-optical display devices including an electroluminescent (EL) display device, for instance. In the latter case, the liquid crystal material is replaced by an electroluminescent material and the orientation layers on the device-stacking substrate and facing substrate are eliminated. Since pairs of electrodes arranged side by side on the same substrate produce electric fields oriented parallel to the surface of the substrate in this invention, it is possible to cause the electroluminescent material to emit light uniformly throughout the display.

What is claimed is:

1. An active matrix electro-optical device comprising:

gate lines and source lines arranged on a substrate to form together a grid pattern;

thin-film transistors located in individual pixels, each of said thin-film transistors having a gate connected to one of said gate lines and a source connected to one of said source lines;

first electrodes individually connected to drains of said thin-film transistors;

common lines maintained at a specified voltage; and second electrodes branching out from said common lines;

wherein said first and second electrodes are arranged into a spiral form with an arm of each of said first electrodes being wound around an arm of a corresponding one of said second electrodes.

2. The device of claim 1 wherein said second electrodes have such segments that are located at least in gaps between said first electrodes and said source lines or between said first electrodes and said gate lines on said substrate.

3. The device of claim 1 wherein said first electrodes are individually surrounded by said second electrodes to prevent said first electrodes from running side by side with either said gate lines or said source lines on said substrate.

4. The device of claim 1 wherein said first and second electrodes are formed in a common plane.

5. The device of claim 1 wherein said first and second electrodes form auxiliary capacitance connected in parallel with each pixel.

6. An active matrix electro-optical device comprising:

first electrodes individually connected to drains of thin-film transistors formed in respective pixels on a substrate;

second electrodes for producing electric fields between said first and second electrodes, said electric fields containing components parallel to said substrate;

wherein said first and second electrodes are individually shaped into a spiral form with an arm of each of said first electrodes being wound around an arm of a corresponding one of said second electrodes.

7. The device of claim 6 wherein said first and second electrodes form auxiliary capacitance connected in parallel with each pixel.

8. The device of claim 6 wherein said first electrodes are individually surrounded by said second electrodes to prevent said first electrodes from running side by side with either gate lines which are connected to gates of said thin-film transistors or source lines which are connected to sources of said thin-film transistors.

9. The device of claim 7 wherein values of said auxiliary capacitance are determined by the numbers of turns of said first and second electrodes.

10. The device of claim 8 wherein said first and second electrodes are formed in a common plane.

11. An active matrix electro-optical device comprising:

gate lines and source lines arranged on a substrate to form together a grid pattern;

thin-film transistors located in individual pixels, each of said thin-film transistors having a gate connected to one of said gate lines and a source connected to one of said source lines;

first electrodes individually connected to drains of said thin-film transistors;

common lines maintained at a specified voltage; and second electrodes branching out from said common lines;

wherein said first and second electrodes are arranged into a spiral form with an arm of each of said first electrodes being wound around an arm of a corresponding one of said second electrodes, and wherein each of said second electrodes has a part located between a corresponding one of said first electrodes and a corresponding one of said source lines.

12. An active matrix electro-optical device comprising:

gate lines and source lines arranged on a substrate to form together a grid pattern;

thin-film transistors located in individual pixels, each of said thin-film transistors having a gate connected to one of said gate lines and a source connected to one of said source lines;

first electrodes individually connected to drains of said thin-film transistors;

common lines maintained at a specified voltage; and second electrodes branching out from said common lines;

wherein said first and second electrodes are arranged into a spiral form with an arm of each of said first electrodes being wound around an arm of a corresponding one of said second electrodes, and wherein each of said second electrodes has a part located between a corresponding one of said first electrodes and a corresponding one of said source lines.

* * * * *